United States Patent [19]

Hlousek et al.

[11] Patent Number: 4,968,122
[45] Date of Patent: Nov. 6, 1990

[54] GALVANOMETER GIMBAL MOUNT

[75] Inventors: Louis Hlousek; Raymond G. Bryan, both of Reno, Nev.

[73] Assignee: Linear Instruments, Reno, Nev.

[21] Appl. No.: 313,683

[22] Filed: Feb. 21, 1989

[51] Int. Cl.$^5$ ............................ G02B 7/00; G02B 7/18
[52] U.S. Cl. .................................... 350/500; 350/484; 356/308
[58] Field of Search ................... 350/162.17, 3.71, 6.5, 350/6.6, 632, 486, 500, 321, 484; 356/332, 334, 308

[56] References Cited

U.S. PATENT DOCUMENTS 3,588,230 6/1971 Thomas ............................ 350/484

4,070,111 1/1978 Harrick .............................. 356/308

Primary Examiner—Bruce Y. Arnold
Assistant Examiner—James Phan
Attorney, Agent, or Firm—Skjerven, Morrill, MacPherson, Franklin & Friel

[57] ABSTRACT

An improved mounting for a rotating diffraction grating assembly as used in a spectrophotometer directly connects the grating to the galvanometer that rotates the grating. The galvanometer is gimbally mounted on a plate so that its position, and that of the grating, can be adjusted so that the plane of dispersion of the grating passes through a desired point when the grating is rotated.

18 Claims, 2 Drawing Sheets

GALVANOMETER GIMBAL MOUNT

BACKGROUND OF THE INVENTION

1. Field of the Invention

In an optical system an optical element may need to be rotated about an axis and require one or two other axes for alignment. The present invention is a device and method for providing such alignment by gimbaling the axis of rotation of the optical element.

2. Description of the Prior Art

Typically in the prior art, an optical element required to rotate about one axis and be adjustable for alignment purposes about the other one or two axes is held in a mount which is coupled directly to the rotational axis. The optical element is aligned about the other one or two axes relative to this mount. That is, in the prior art the axis of rotation is fixed and the optical element is moved by its mount relative to the axis of rotation.

This prior art approach is satisfactory for some systems. However, in other systems it is important for the purposes of the system of which the Optical element is a component that the optical element be rotated very quickly and accurately. In these systems the prior art is deficient because the mass of the mounting substantially increases the mass moment of inertia of the optical element, and so makes fast and accurate rotation difficult. FIG. 1 illustrates a typical prior art mount 20 for a diffraction grating 24, having diffraction surface 26. The axis of rotation of grating 24 is $A_R$. Two screws 28A, 28B (only one of which 28A is fully shown) provide adjustment of grating 24 about one axis. A screw 30 provides adjustment about a second axis.

Other commercially available prior art mounts used for non-rotating optical elements (not shown) are gimbal mounts for optical elements which allow adjustment of the optical plane of the optical element about two axes independently by fine pitch micrometer screws. However, these mounts do not provide any axis of rotation for the optical element. That is to say, these commercially available mounts are adjustable but not rotatable.

SUMMARY OF THE INVENTION SUMMARY OF THE

Therefore, for some applications it is desirable to have the optical element fixed to the rotational axis without use of the prior art mount so as to decrease the inertia of the components being rotated, to occupy less space, and to simplify the connection between the driving and driven components.

Prior art mountings do not permit this combination of a mounting with the optical element fixed to the axis of rotation, while permitting necessary adjustments of the position of the optical element relative to the optical system.

The present invention does achieve the object of eliminating the mounting of the optical element while directly coupling the optical element to the rotating means.

The optical element in the preferred embodiment of the present invention is a diffraction grating. Rotation of the grating is used conventionally to selectively aim a portion of a diffracted spectrum of light to a desired point. The two adjustable axes of the optical element make the entire diffracted spectrum pass through this point as the diffraction grating is rotated. In this application the speed and accuracy of moving the diffraction grating from one position to another about its rotational axis is important. Thus direct coupling between the diffraction grating and the output shaft of the driving device is necessary to achieve the low inertia, balanced configuration required for the speed and accuracy.

In the gimballing system in accordance with the present invention, adjustment about one axis causes the spectrum to translate roughly perpendicular to the optical plane of dispersion and adjustment about the other axis causes the spectrum to rotate.

Thus in accordance with the present invention, the optical element is directly coupled to the rotating means and the rotating means is gimbal mounted so as to be adjustable in two dimensions relative to the optical system. Thus the optical plane of the optical element can be adjusted so as to pass through a desired point when the element is rotated.

In another embodiment, the optical element is gimbal mounted so as to be adjustable in one dimension relative to the optical systems.

Since the gimbal mount is attached to the rotating means, no adjustable mounting need be rotated with the optical element, thus minimizing the mass moment of inertia of the optical element.

Thus in accordance with the present invention, the axis of rotation is moved relative to the optical system, which results in the benefits of better balance and less mass moment of inertia compared to the prior art method of moving the optical element relative to the axis of rotation.

BRIEF DESCRIPTION OF THE DRAWINGS

Similar reference numerals in different figures refer to similar or identical structures.

DETAILED DESCRIPTION OF THE INVENTION

Figure 2:
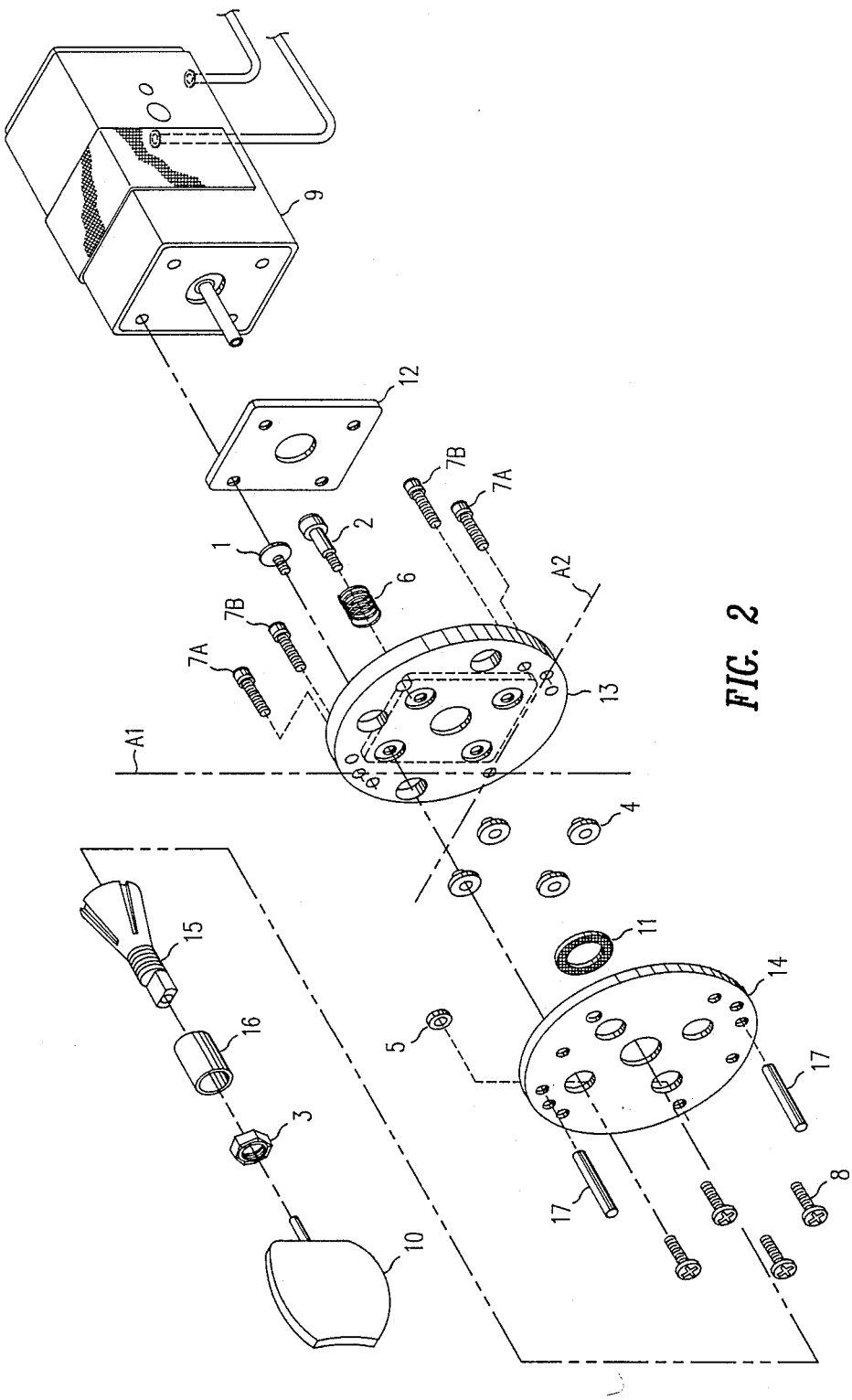
FIG. 2 shows an exploded view of the preferred embodiment of the present invention.

Shown in an exploded view in FIG. 2 is a galvanometer assembly 30 which applies the gimballing principle in accordance with the invention to align the optical plane of a concave holographic diffraction grating. The galvanometer 9 is a special motor conventionally used to rotate the diffraction grating 10. Galvanometer 9 is preferably commercially available part no. G325DT from General Scanning. The diffraction grating 10 (preferably a custom made concave grating) is directly coupled to the shaft of the galvanometer 9 by use of nut 3, collet 15, and sleeve 16. The galvanometer 9 is attached to the top plate 13 by four screws 8. Insulators 4 and insulator 12 conventionally thermally insulate the galvanometer 9 from the top plate 13. The top plate 13 is attached to the bottom plate 14 by the screw 1 and separated from bottom plate 14 by pivot spacer 5. Top plate 13 and bottom plate 14 are both preferably circular and about 2.5 inches (6.3 cm) in diameter, and both preferably are conventionally fabricated from aluminum with a black anodized finish. Top plate 13 is preferably about 0.25 inches (6.3 mm) thick; bottom plate 14 is preferably about 0.125 inches (3.1 mm) thick.

Gasket 11 is a gasket used to prevent light from entering between the top plate 13 and bottom plate 14. The top plate 13 is forced toward the bottom plate 14 opposite the pivot spacer 5 by the spring 6 and shoulder screw 2. Two adjustment screws 7A are preferably threaded through the top plate 13 and push off the bottom plate 14 in opposition to the spring 6 separating the two plates 13, 14. These two adjustment screws 7A are located midway between the pivot spacer 5 and spring 6, and on opposite sides of the galvanometer 9. Use of these two adjustment screws 7A in opposition to the spring 6 tilts the top plate 13 relative to the bottom plate 14 and allows for alignment about two axes. The two axes A1, A2 pass through the point established by the spacer 5 and screw 1, and the locations of adjustment screws 7A.

Axis A1 is the axis of rotation for optical dispersion translation, and axis A2 is the axis of rotation for optical dispersion rotation. Thus, with the bottom plate 14 mounted to the optical system the alignment can be made with respect to the optical system and the desired aiming of the spectrum achieved. Adjacent to the previously described adjustment screws 7A are two additional adjustment screws 7B which pass through the top plate 13 and thread into the bottom plate 14 to lock the alignment. The top plate 13 has a clearance hole and the bottom plate 14 is threaded. Two dowel pins 17 maintain the orientation between the top 13 and bottom plates 14. The dowel pins 17 are also used to align the galvanometer assembly with the optical system.

Figure 3:
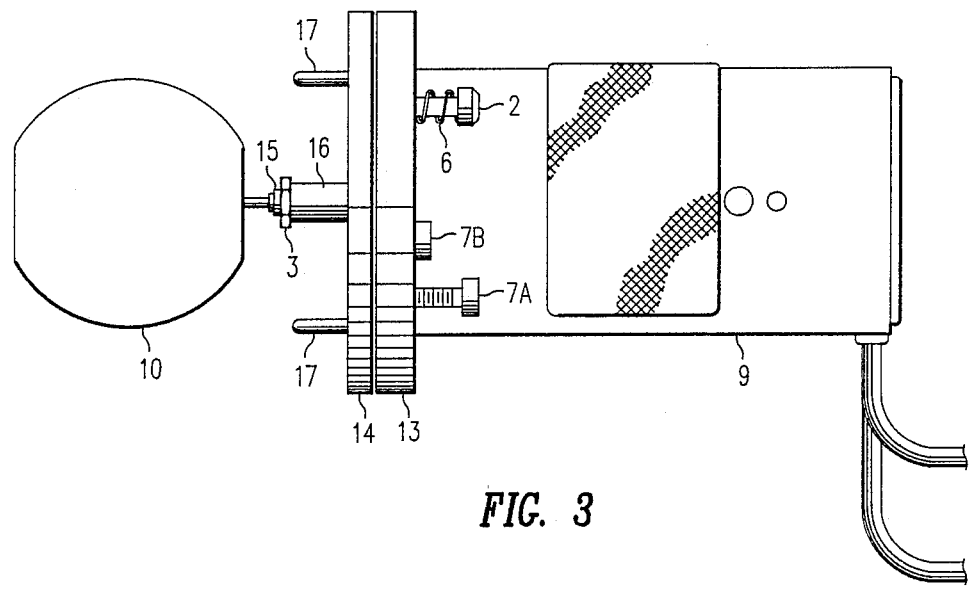
FIG. 3 shows a side view of the preferred embodiment of the present invention.

FIG. 3 shows the galvanometer assembly assembled, in side view. Visible are diffraction grating 10, collet 15, nut 3, sleeve 16, dowel pins 17, bottom plate 14, top plate 13, spring 6, shoulder screw 2, screws 7A, 7B, and galvanometer 9.

Galvanometer 9 is thus firmly attached to top plate 13, and galvanometer 9 and top plate 13 are gimballed relative to bottom plate 14, which is attached to the framework 32 of the optical system (i.e., a spectrophotometer instrument, not shown).

The adjustment of the galvanometer assembly in the preferred embodiment is made at the factory when the optical system is assembled. The adjustment is made by adjusting the adjustment screws 7A. Then the adjustment screws 7B are tightened to hold the adjustment just made against shock. The object of the adjustment is to make the plane of optical dispersion of the grating parallel to the plane of the bottom plate 14, and pass through a desired point when the grating 10 is rotated via collet 15 which is fixed to the output shaft of galvanometer 9.

In alternate embodiments, instead of using a spring loaded mechanism and adjustment screws, the top 13 and bottom plate 14 are adjusted relative to each other by means of wedges, shims, or cams. Any other kind of conventional one or two dimensional mechanical adjustment is used in other embodiments of the invention.

The present invention, in yet other embodiments, is not limited to diffraction gratings or spectrophotometry but is applicable to any rotating optical element where the optical plane is to be adjusted relative to the axis of rotation of the optical element.

We claim:

1. An optical system comprising:
a support;
an optical element having an optical plane of dispersion;
means for rotating the optical element about an axis of rotation, the means for rotating being fixed to the optical element; and
means for adjusting the optical element and the means for rotating together relative to the support.

2. The system of claim 1, wherein the means for adjusting adjusts simultaneously the optical element and means for rotating so that the optical plane passes through a desired point when the optical element is rotated.

3. The system of claim 1, wherein the means for adjusting comprises a gimbal mounting adjustable relative to the support for the means for rotating.

4. The system of claim 3, wherein the gimbal mounting adjusts the means for rotating in at least one dimension relative to the support.

5. The system of claim 4, wherein the gimbal mounting adjusts the means for rotating in two dimensions.

6. The system of claim 3 wherein the gimbal mounting comprises a spring loaded adjustment for adjusting the means for rotating.

7. The system of claim 1, wherein the optical element comprises a diffraction grating.

8. The system of claim 7, wherein the means for rotating comprises a galvanometer.

9. The system of claim 8, wherein the galvanometer is directly coupled to the diffraction grating.

10. An optical system comprising: a diffraction grating having a plane of dispersion;
a galvanometer directly coupled to the diffraction grating for rotating the diffraction grating about an axis of rotation;
a gimbal mounting on which the galvanometer is mounted, the gimbal mounting including a mechanical adjustment for adjusting the plane of dispersion in at least one dimension relative to the optical system so as to cause the plane of dispersion to pass through a desired point when rotated.

11. The system of claim 10, wherein the mechanical adjustment adjusts the plane of dispersion in two dimensions.

12. A method of adjusting the optical plane of a rotating optical element to pass through a desired point when rotated, comprising the steps of:
directly coupling the optical element to a means for rotating the optical element;
mounting the means for rotating on a gimbal mounting adjustable in at least one dimension relative to the optical system; and
adjusting the gimbal mounting so as to cause the optical plane to pass through a desired point when rotated.

13. An optical system comprising:
a galvanometer having a rotating shaft;
a first plate having a first surface on which the galvanometer is fixedly mounted, an end of the rotating shaft protruding through a hole defined by the first plate;
a second plate attachable to a framework of the optical system and held in adjustable contact with a second surface of the first plate by at least two adjustable screws each passing through at least a portion of the first plate and being in contact with the second plate, the end of the rotating shaft also protruding through a hole defined by the second plate;
a spring held between the first and second plates; and
a diffraction grating directly fixed to the protruding end of the rotating shaft, wherein adjustment of the at least two adjustable screws adjusts a plane of dispersion of the diffraction grating relative to the framework in two dimensions.

14. An optical system comprising:
a diffraction grating having an optical plane of dispersion;
a galvanometer directly coupled to the diffraction grating for rotating the diffraction grating about an axis of rotation; and
means for adjusting the diffraction grating and galvanometer together relative to the optical system.

15. An optical system comprising:
an optical element having an optical plane of dispersion;
a galvanometer directly coupled to the optical element for rotating the optical element about an axis of rotation; and
means for adjusting the optical element and galvanometer together relative to the optical system.

16. An optical system comprising:
a support plate;
a diffraction grating having a plane of dispersion;
a galvanometer directly coupled to the diffraction grating for rotating the diffraction grating about an axis of rotation;
a gimbal mounting plate on which the galvanometer is fixedly mounted, the gimbal mounting plate including a mechanical adjustment for positioning the gimbal mounting plate relative to the support plate and thereby adjusting the plane of dispersion in at least one dimension relative to the optical system so as to cause the plane of dispersion to pass through a desired point when the optical element is rotated.

17. The system of claim 16 wherein the mechanical adjustment adjusts the plane of dispersion in two dimensions.

18. A method of adjusting the optical plane of a rotating optical element to pass through a desired point when rotated, comprising the steps of:
providing a support;
directly coupling the optical element to a means for rotating the optical element;
mounting the means for rotating on a gimbal mounting plate adjustable in at least on dimension relative to the support; and
adjusting the gimbal mounting plate so as to cause the optical plane to pass through a desired point when the optical element is rotated.

* * * * *

UNITED STATES PATENT AND TRADEMARK OFFICE
CERTIFICATE OF CORRECTION

Figure 1:
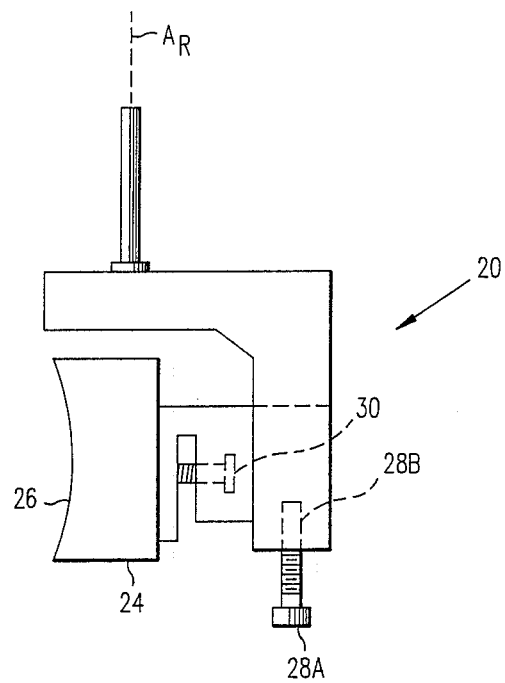
FIG. 1 shows a prior art diffraction grating mounting.

PATENT NO.    :   4,968,122
DATED         :   November 6, 1990
INVENTOR(S)   :   Louis Hlousek and Raymond G. Bryan It is certified that error appears in the above-identified patent and that said Letters Patent is hereby corrected as shown below:

Sheet 1 of 2 of the drawings, FIG. 1, add --PRIOR ART--.

Col. 1, line 22, delete "Optical" and insert --optical--.

Col. 1, lines 44-45, delete "SUMMARY OF THE".

Col. 2, line 46, delete "30".

Col. 6, line 20, delete "on" and insert --one--.

Signed and Sealed this

Nineteenth Day of May, 1992

Attest:

DOUGLAS B. COMER

Attesting Officer

Acting Commissioner of Patents and Trademarks